(12) United States Patent
Tomita et al.

(10) Patent No.: US 10,686,374 B2
(45) Date of Patent: Jun. 16, 2020

(54) CONTROL APPARATUS FOR POWER CONVERSION APPARATUS

(71) Applicants: SOKEN, INC., Nisshin, Aichi-pref. (JP); DENSO CORPORATION, Kariya, Aichi-pref. (JP)

(72) Inventors: Kenji Tomita, Nisshin (JP); Seiji Iyasu, Nisshin (JP); Yuichi Handa, Kariya (JP)

(73) Assignees: SOKEN, INC., Nisshin (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/191,986

(22) Filed: Nov. 15, 2018

(65) Prior Publication Data
US 2019/0157974 A1    May 23, 2019

(30) Foreign Application Priority Data
Nov. 17, 2017    (JP) .................. 2017-221525

(51) Int. Cl.
*H02M 3/156* (2006.01)
*H02M 1/08* (2006.01)
(Continued)

(52) U.S. Cl.
CPC ............ *H02M 3/156* (2013.01); *H02M 1/08* (2013.01); *H02M 1/32* (2013.01); *H02M 2001/0009* (2013.01)

(58) Field of Classification Search
CPC ......... H02M 3/156; H02M 2001/0048; H02M 1/32; H02M 1/08; H02M 2001/0009
See application file for complete search history.

(56) References Cited

U.S. PATENT DOCUMENTS

| | | | |
|---|---|---|---|
| 2003/0173937 A1* | 9/2003 | Uematsu | H02M 3/1584 323/205 |
| 2008/0130336 A1* | 6/2008 | Taguchi | H02M 1/4225 363/125 |

(Continued)

FOREIGN PATENT DOCUMENTS

| | | |
|---|---|---|
| JP | H06-197531 A | 7/1994 |
| JP | H10-323024 A | 12/1998 |

(Continued)

*Primary Examiner* — Kyle J Moody
(74) *Attorney, Agent, or Firm* — Oliff PLC

(57) ABSTRACT

A control apparatus performs peak current mode control in which a drive switch is turned off when output of a comparator is inverted during an on-operation period determined by a basic signal. The comparator inverts the output when a reactor current increases to a command current. The control apparatus determines that a switching frequency of the drive switch is required to be switched when the output of the comparator is detected to have not become inverted during the single switching period while the peak current mode control is being performed. The control apparatus sets the switching frequency to a first frequency when the switching determining unit determines that the switching frequency is not required to be switched, and switches the switching frequency from the first frequency to a second frequency lower than the first frequency when the switching determining unit determines that the switching frequency is required to be switched.

6 Claims, 9 Drawing Sheets

(51) Int. Cl.
  *H02M 1/32* (2007.01)
  *H02M 1/00* (2006.01)

(56) References Cited

U.S. PATENT DOCUMENTS

| | | | |
|---|---|---|---|
| 2011/0058285 A1* | 3/2011 | Wibben | H02M 1/32 361/18 |
| 2012/0126764 A1 | 5/2012 | Urakabe et al. | |
| 2012/0268972 A1 | 10/2012 | Daigo et al. | |
| 2014/0104890 A1 | 4/2014 | Matsubara et al. | |
| 2014/0204634 A1* | 7/2014 | Daigo | H02M 1/15 363/48 |
| 2016/0001661 A1 | 1/2016 | Hatanaka et al. | |
| 2017/0033696 A1* | 2/2017 | Handa | H02M 3/33584 |
| 2017/0155319 A1* | 6/2017 | Deng | H02M 1/083 |
| 2019/0149055 A1 | 5/2019 | Tomita et al. | |

FOREIGN PATENT DOCUMENTS

| | | | |
|---|---|---|---|
| JP | 2001-282189 A | 10/2001 | |
| JP | 2002-272099 A | 9/2002 | |
| JP | 2009-213202 A | 9/2009 | |
| JP | 2009-232662 A | 10/2009 | |
| JP | 2009-284668 A | 12/2009 | |
| JP | 2014-018026 A | 1/2014 | |

* cited by examiner

CONTROL APPARATUS FOR POWER CONVERSION APPARATUS

CROSS-REFERENCE TO RELATED APPLICATION

This application is based on and claims the benefit of priority from earlier Japanese Patent Application No. 2017-221525, filed Nov. 17, 2017, the description of which is incorporated herein by reference.

BACKGROUND

Technical Field

The present disclosure relates to a control apparatus that is applied to a power conversion apparatus that includes a reactor and a drive switch.

Related Art

In a power conversion apparatus that includes a drive switch, when the input voltage becomes lower than a predetermined value, even when a time ratio that is a ratio of an on-operation period relative to a single switching period of the drive switch is set to maximum, the output voltage may not be able to be increased to a command voltage. Therefore, in a control apparatus disclosed in JP-A-2009-232662, when the input voltage is determined to be lower than a predetermined value, the on-operation period is increased by the frequency of an operating signal for operating the drive switch being decreased.

Here, peak current mode control is known as a method for controlling the power conversion apparatus. In the peak current mode control, the drive switch is operated so as to control a current that flows to the drive switch to a command current. In the peak current mode control, in terms of controlling the output voltage to the command voltage, determination of a state in which the time ratio is set to a maximum value thereof is required.

SUMMARY

It is thus desired to provide a control apparatus that performs peak current mode control and is capable of determining a state in which a ratio of an on-operation period relative to a single switching period of a drive switch is set to a maximum value thereof.

An exemplary embodiment of the present disclosure provides a control apparatus for a power conversion apparatus. The power conversion apparatus includes: a reactor; a drive switch that is turned on and off; a current detecting unit that detects a reactor current that flows to the reactor; and a signal generating unit that generates a basic signal that determines a single switching period of the drive switch. The control apparatus includes a current control unit, a switching determining unit, and a frequency switching unit.

The current control unit that includes a comparator. The comparator inverts output when the reactor current increases to a command current. The current control unit performs peak current mode control in which the drive switch is turned off when the output of the comparator is inverted during an on-operation period determined by the basic signal.

The switching determining unit determines that a switching frequency of the drive switch is required to be switched when the output of the comparator is detected to have not become inverted during the single switching period while the peak current mode control is being performed.

The frequency switching unit sets the switching frequency to a first frequency when the switching determining unit determines that the switching frequency is not required to be switched, and switches the switching frequency from the first frequency to a second frequency that is lower than the first frequency when the switching determining unit determines that the switching frequency is required to be switched.

The inventors of the present disclosure have focused on the following state while the peak current mode control to turn off the drive switch is being performed, when inversion of the output from the comparator is detected during the on-operation period determined by the basic signal. That is, the reactor current that flows to the reactor increases in accompaniment with the increase in the on-operation period of the drive switch. Therefore, when a state in which the rector current increases to the command current and a state in which the reactor current does not increase to the command current during the single switching period are compared, in the latter state, the likelihood that a ratio of the on-operation period relative to the single switching period is at a maximum possible value is high.

In this regard, in the configuration described above, when the output of the comparator is detected to have not become inverted during the single switching period of the operating signal, switching of the switching frequency of the drive switch is determined to be required. When switching of the switching frequency is determined to not be required, the switching frequency is set to the first frequency. When switching of the switching frequency is determined to be required, the switching frequency is switched from the first frequency to the second frequency that is lower than the first frequency. Therefore, the control apparatus is capable of determining a state in which the ratio of the on-operation period relative to the single switching period of the drive switch is at the maximum value thereof, while the peak current mode control is being performed.

DESCRIPTION OF THE EMBODIMENTS

First Embodiment

A power conversion apparatus according to a first embodiment will be described. The power conversion apparatus is used to supply direct-current power supplied from a direct-current power supply to a power supply target.

Figure 1:
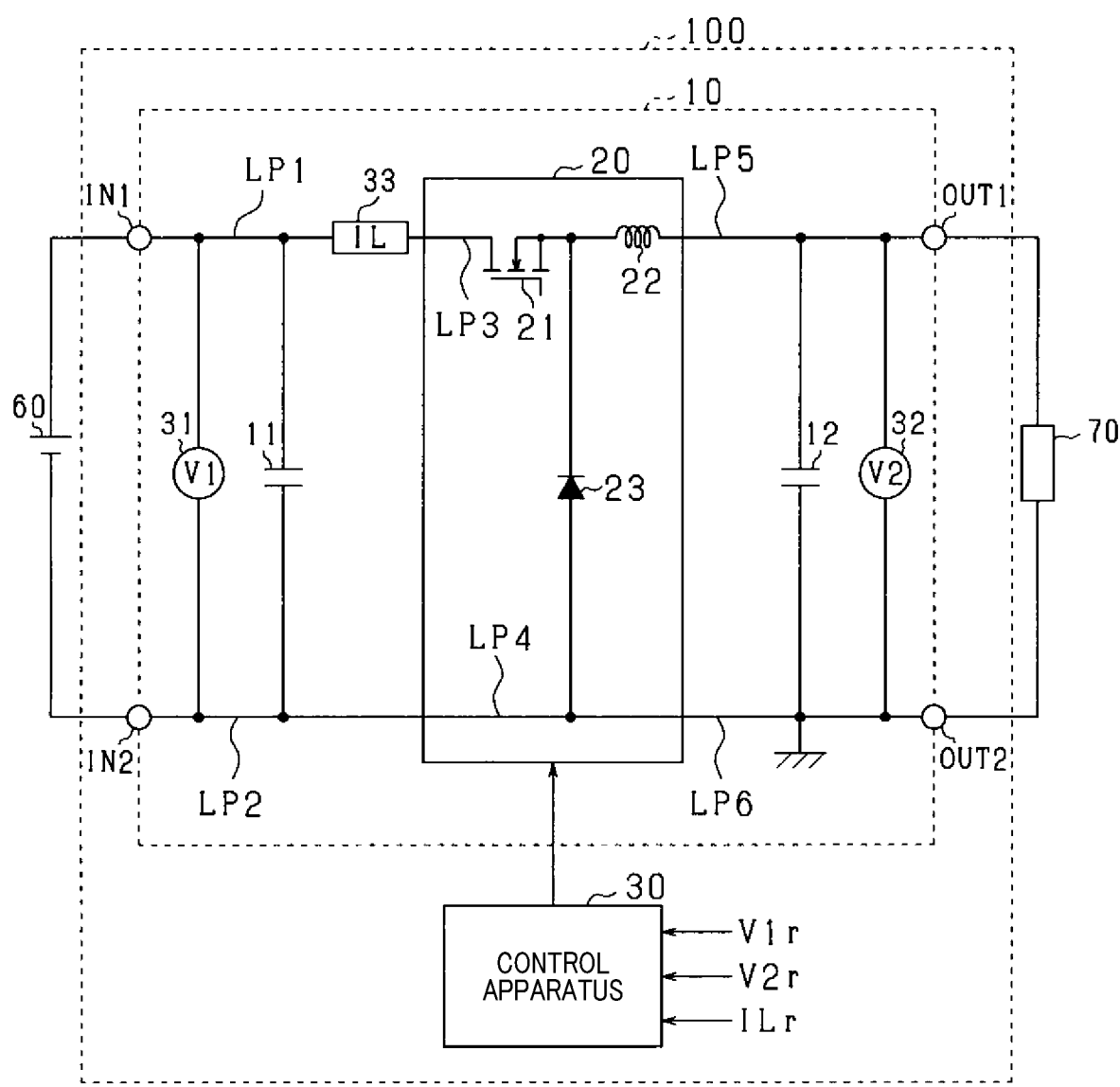
FIG. 1 is a circuit diagram of a power conversion apparatus according to a first embodiment.

FIG. 1 is a circuit diagram of a power conversion apparatus 100 according to the present embodiment. A positive terminal of a direct-current power supply 60 is connected to a first input terminal IN1 of the power conversion apparatus 100. A negative terminal of the direct-current power supply 60 is connected to a second input terminal IN2 of the power conversion apparatus 100. According to the present embodiment, for example, the direct-current power supply 60 is a storage battery such as a lithium-ion storage battery. In addition, an apparatus 70 is connected to a first output terminal OUT1 and a second output terminal OUT2 of the power conversion apparatus 100. The apparatus 70 is an on-board monitor or the like, and corresponds to the power supply target.

The power conversion apparatus 100 includes a direct-current-to-direct-current (DC-DC) converter 100. According to the present embodiment, the DC-DC converter 10 is a buck chopper (step-down chopper) type converter that decreases the direct-current voltage supplied from the direct-current power supply 60.

The DC-DC converter 10 includes a filter capacitor 11, a main circuit 20, and a smoothing capacitor 12. According to the present embodiment, in the DC-DC converter 10, among high-voltage-side wiring to which a high voltage from the direct-current power supply 60 is applied, wiring that connects the first input terminal IN1 and the main circuit 20 is referred to as first wiring LP1.

In addition, among low-voltage-side wiring to which a low voltage from the direct-current power supply 60 is applied, wiring that connects the second input terminal IN2 and the main circuit 20 is referred to as second wiring LP2. Furthermore, among the high-voltage-side wiring, wiring that configures the main circuit 20 is referred to as third wiring LP3. Among the low-voltage-side wiring, wiring that configures the main circuit 20 is referred to as fourth wiring LP4. Still further, among the high-voltage-side wiring, wiring that connects the main circuit 20 and the first output terminal OUT1 is referred to as fifth wiring LP5. Among the low-voltage-side wiring, wiring that connects the main circuit 20 and the second output terminal OUT2 is referred to as sixth wiring LP6.

The first wiring LP1 and the second wiring LP2 are connected by the filter capacitor 11. The main circuit 20 includes a drive switch 21, a reactor 22, and a diode 23. According to the present embodiment, the drive switch 21 is an n-channel metal-oxide-semiconductor field-effect transistor (MOSFET). In the third wiring LP3, a drain of the drive switch 21 is connected to the filter capacitor 11 side and a source is connected to a first end side of the reactor 22. A second end of the reactor 22 is connected to the fifth wiring LP5. A cathode of the diode 23 is connected between the source of the drive switch 21 and the first end of the reactor 22 in the third wiring LP3. An anode of the diode 23 is connected to the fourth wiring LP4.

The fifth wiring LP5 and the sixth wiring LP6 are connected by the smoothing capacitor 12. Of the fifth wiring LP5, a side opposite the side connected to the main circuit 20 is connected to the first output terminal OUT1. Of the sixth wiring LP6, a side opposite the side connected to the main circuit 20 is connected to the second output terminal OUT2.

The power conversion apparatus 100 includes a first voltage detecting unit 31, a second voltage detecting unit 32, and a current sensor 33.

The first voltage detecting unit 31 is connected in parallel to the filter capacitor 11 between the first and second input terminals IN1 and IN2 and the filter capacitor 11, in the first and second wirings LP1 and LP2. As a result, the first voltage detecting unit 31 detects a voltage supplied from the direct-current power supply 60 as an input voltage V1r.

The second voltage detecting unit 31 is connected in parallel to the smoothing capacitor 12 between the smoothing capacitor 12 and the first and second output terminals OUT1 and OUT2, in the fifth and sixth wirings LP5 and LP6. As a result, the second voltage detecting unit 32 detects a voltage across terminals of the smoothing capacitor 12 as an output voltage V2r.

The current sensor 33 is connected in series between the filter capacitor 11 and the main circuit 20 in the first wiring LP1. As a result, the current sensor 33 detects a reactor current ILr that flows to the reactor 22 in the main circuit 20. According to the present embodiment, the current sensor 33 corresponds to a current detecting unit.

The power conversion apparatus 100 includes a control apparatus 30. The control apparatus 30 is configured by a known microcomputer. The control apparatus 30 outputs an operating signal GS for operating the drive switch 21 to control the output voltage V2r to a command voltage V2*. For example, functions provided by the control apparatus 30 can be provided by software that is recorded on a tangible memory apparatus and a computer that runs the software, hardware, or a combination thereof.

Figure 2:
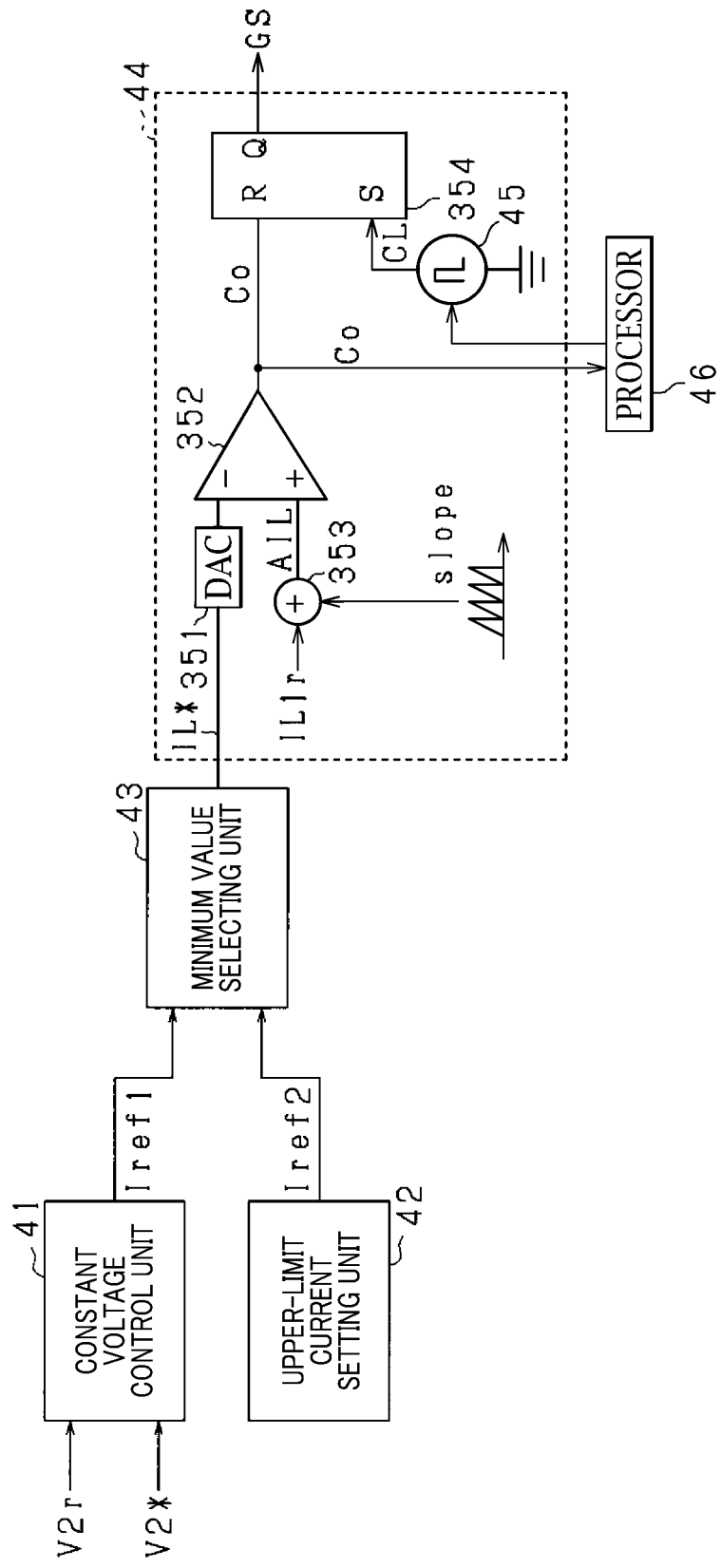
FIG. 2 is a functional block diagram of a control apparatus for the power conversion apparatus according to the first embodiment.

According to the present embodiment, the control apparatus 30 performs known peak current mode control to control the reactor current ILr to a command current IL*. As shown in FIG. 2, the control apparatus 30 includes a constant voltage control unit 41, an upper-limit current setting unit 42, a minimum value selecting unit 43, a current control unit 44, a signal generating unit 45, and a processor 46.

The constant voltage control unit 41 calculates a target current value Iref1 as a manipulated variable used to perform feedback control to control the output voltage V2r to the command voltage V2*. The target current value Iref1 is a target value of the output current of the DC-DC converter 10.

The upper-limit current setting unit 42 calculates an upper-limit current value Iref2. The upper-limit current value Iref2 is set based on a rated current of the DC-DC converter 10. For example, the upper-limit current value Iref2 is determined taking into consideration the current flowing to the reactor 22 and the like.

The minimum value selecting unit 43 compares the target current value Iref1 outputted from the constant voltage control unit 41 and the upper-limit current value Iref2 outputted from the upper-limit current setting unit 42. The minimum value selecting unit 43 outputs the smaller of the target current value Iref1 and the upper-limit current value Iref2 as the command current IL*.

The signal generating unit 45 generates a clock signal CL. A single period of the clock signal CL corresponds to a single switching period of the drive switch 21. For example, the signal generating unit 45 is a known clock generator that is capable of changing the frequency of the clock signal CL. In the present embodiment, the signal generating unit 45 changes the frequency of the clock signal CL in response to a command for switching the frequency of the operating signal GS that is transmitted from the processor 46. The processor 46 monitors the output signal Co of the comparator 352 and transmits the command for switching the frequency of the operating signal GS to the signal generating unit 45 in response to the changes in the output signal Co of the comparator 352.

The adder 353 adds the reactor current ILr detected by the current sensor 33 and a slope compensation signal Slope. The adder 353 then outputs the sum as a post-compensation reactor current AIL. The post-compensation reactor current AIL outputted from the adder 353 is inputted to a non-inverting input terminal of the comparator 352. The slope compensation signal Slope is used to suppress oscillation that accompanies variations (fluctuations) in the current flowing to the reactor 22.

The comparator 352 compares the command current IL* and the post-compensation reactor current AIL. During a period in which the post-compensation reactor current AIL is less than the command current IL*, the comparator 352 inputs a low-level output signal Co to an R terminal of the RS flip-flop 354. In addition, during a period in which the post-compensation reactor current AIL is greater than the command current IL*, the comparator 352 inputs a high-level output signal Co to the R terminal of the RS flip-flop 354.

Furthermore, the clock signal CL from the signal generating unit 45 is inputted to an S terminal of the RS flip-flop 354. A period during which the operating signal GS outputted from an output terminal Q of the RS flip-flop 354 is high is an on-operation period during which the drive switch 21 is turned on. Meanwhile, a period during which the operating signal GS is low is an off-operation period during which the drive switch 21 is turned off.

According to the present embodiment, when the frequency of the operating signal GS is a first frequency F1, the signal generating unit 45 outputs a first clock signal CL1. In addition, when the frequency of the operating signal GS is a second frequency F2 that is lower than the first frequency F1, the signal generating unit 45 outputs a second clock signal CL2. The first and second clock signals CL1 and CL2 correspond to a basic signal.

Figure 3A:
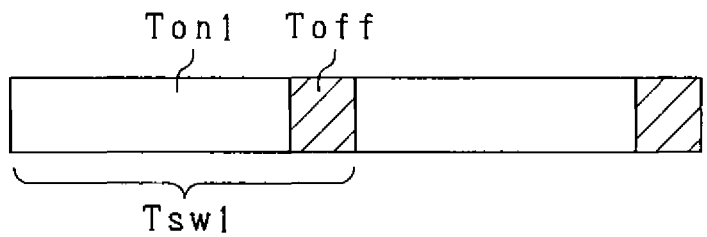
FIG. 3A and FIG. 3B are diagrams of an on-operation period Ton and an off-operation period Toff during a single switch period according to the first embodiment.
Figure 3B:
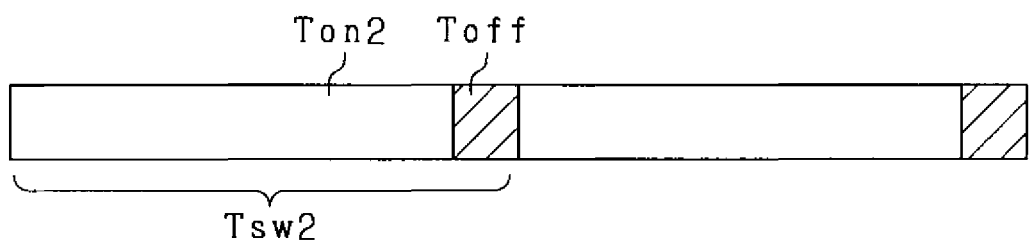

FIG. 3A shows an on-operation period Ton and an off-operation period Toff that compose a single switching period when the frequency of the operating signal GS is the first frequency F1. Hereafter, the single switching period corresponding to the first frequency F1 is referred to as a first period Tsw1 (=1/F1). FIG. 3B shows the on-operation period Ton and the off-operation period Toff that compose a single switching period when the frequency of the operating signal GS is the second frequency F2. Hereafter, the single switching period corresponding to the second frequency F2 is referred to as a second period Tsw2 (=1/F2).

As a result of the frequency of the operating signal GS being changed from the first frequency F1 to the second frequency F2, the single switching period of the drive switch 21 changes from the first period Tsw1 to the second period Tsw2 that is longer than the first period Tsw1. In addition, an on-operation period Ton2 of the second period Tsw2 is longer than an on-operation period Ton1 of the first period Tsw1.

According to the present embodiment, a minimum off-operation period Toff is determined in the single switching period Tsw such that the off-operation period Toff occurs without exception during the single switching period Tsw. Therefore, regardless of whether the frequency of the operating signal GS is the first frequency F1 or the second frequency F2, a time ratio (duty ratio) Dr (=Ton1/Tsw1, Ton2/Tsw2) of the on-operation period Ton relative to the single switching period Tsw is a value that is less than 100%. The first and second frequencies F1 and F2 determined by the operating signal GS correspond to a switching frequency of the drive switch 21.

Next, an operation of the DC-DC converter 10 will be described. The DC-DC converter 10 is set to either of a first state and a second state by the operating signal GS outputted from the control apparatus 30. In the first state, the reactor current ILr increases. In the second state, the reactor current ILr decreases.

In the first state, the operating signal GS is high and the drive switch 21 is turned on. Therefore, magnetic energy is stored in the reactor 22 and the reactor current ILr increases.

In the second state that follows the first state, the operating signal GS outputted from the control apparatus 30 is low and the drive switch 21 is turned off. Therefore, a closed circuit that includes the diode 23, the reactor 22, and the apparatus 70 is formed. In addition, as a result of the reactor 22 starting discharge, a current flows to the closed circuit and the reactor current ILr decreases.

In addition, when the time ratio of the on-operation period Ton is detected to be a maximum value thereof while the peak current mode control is being performed, the control apparatus 30 performs a switching determination process to determine whether the frequency of the operating signal GS is required to be switched. Then, when determined that the frequency of the operating signal GS is required to be switched as a result of the switching determination process, the control apparatus 30 switches the frequency of the operating signal GS from the first frequency F1 to the second frequency F2.

Figure 4:
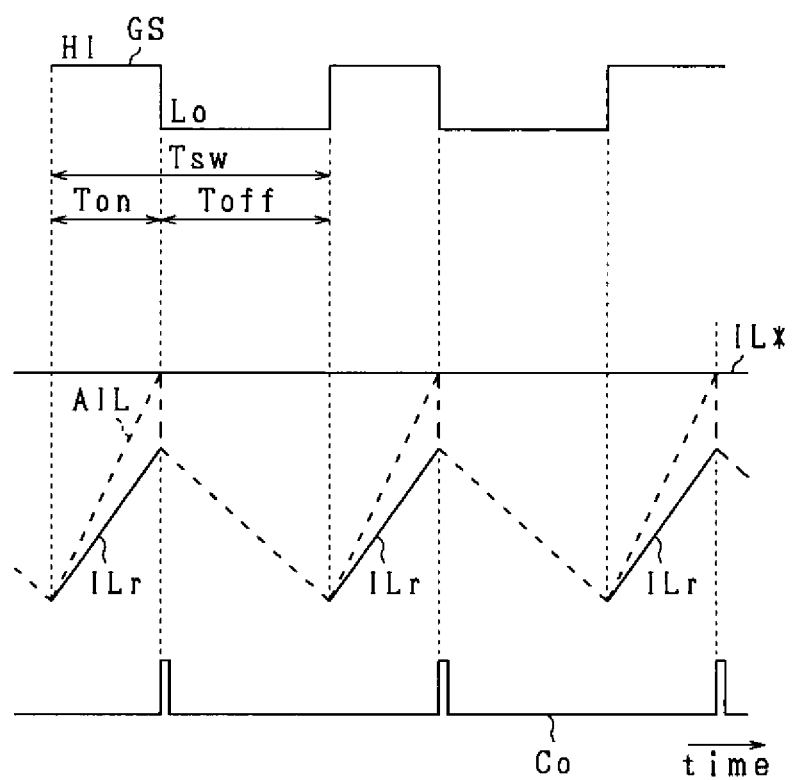
FIG. 4 is a diagram for explaining the principles of switching determination according to the first embodiment.
Figure 5:
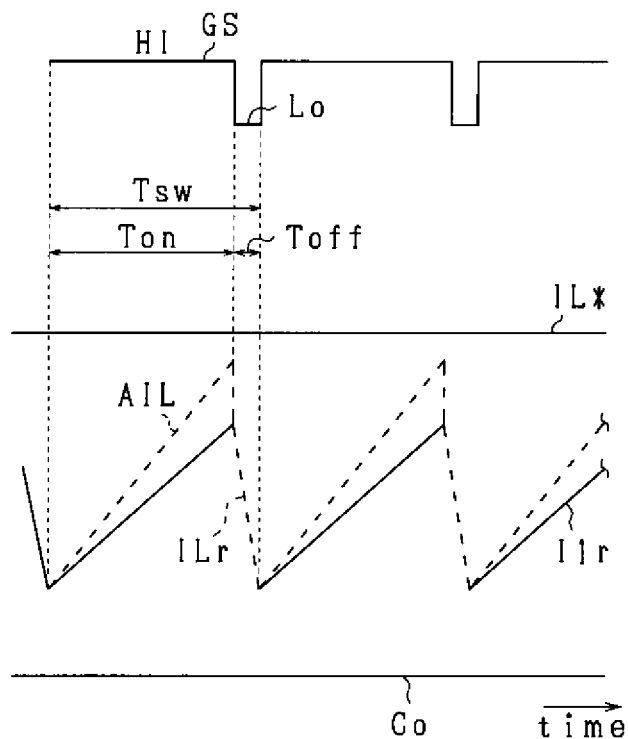
FIG. 5 is a diagram for explaining the principles of switching determination according to the first embodiment.

FIG. 4 and FIG. 5 are diagrams for explaining the principles of switching determination according to the present embodiment. FIG. 4 shows transitions in the post-compensation reactor current AIL and the command current IL* when the post-compensation reactor current AIL increases to the command current IL* during the single switching period Tsw. FIG. 5 shows transitions in the post-compensation reactor current AIL and the command current IL* when the post-compensation reactor current AIL does not increase to the command current IL* during the switching period Tsw.

In accompaniment with the increase in the on-operation period Ton of the drive switch 21, the magnetic energy of the reactor 22 increases and the reactor current ILr increases. In FIG. 4, the post-compensation reactor current AIL increases to the command current IL* before the maximum value of the on-operation period Ton possible for the operating signal GS during the single switching period Tsw is reached. Therefore, the operating signal GS changes from high to low at a timing at which the output signal Co of the comparator 352 changes from low to high. As a result, the drive switch 21 is turned off and the reactor current ILr changes from an increasing state to a decreasing state.

In FIG. 5, even when the maximum value of the on-operation period Ton possible for the operating signal GS during the single switching period Tsw is exceeded, the post-compensation reactor current AIL does not increase to the command current IL*. Therefore, the output signal Co of the comparator 352 is not inverted. In the state shown in FIG. 5, subsequently, as a result of the operating signal GS switching from high to low, the drive switch 21 is turned off and the reactor current ILr changes from an increasing state to a decreasing state.

As shown in FIG. 4 and FIG. 5, in the state in which the post-compensation reactor current AIL does not increase to the command current IL* during the single switching period Tsw, the likelihood that the time ratio Dr is at the maximum value thereof is high. Meanwhile, in the state in which the post-compensation reactor current AIL has increased to the command current IL* during the single switching period Tsw, the likelihood that the time ratio Dr is not at the maximum value thereof is high.

When the input voltage V1r decreases or the command voltage V2* increases in the state in which the time ratio Dr is at the maximum value thereof, the output voltage V2r may not be able to be controlled to the command voltage V2*. Therefore, the control apparatus 30 determines whether or not the time ratio Dr is at the maximum value thereof based on whether or not the output signal Co of the comparator 352 is logically inverted during the single switching period Tsw. When determined that the output signal Co of the comparator 352 has not switched from low to high during the single switching period Tsw, the control apparatus 30 switches the frequency of the operating signal from the first frequency F1 to the second frequency F2.

Figure 6:
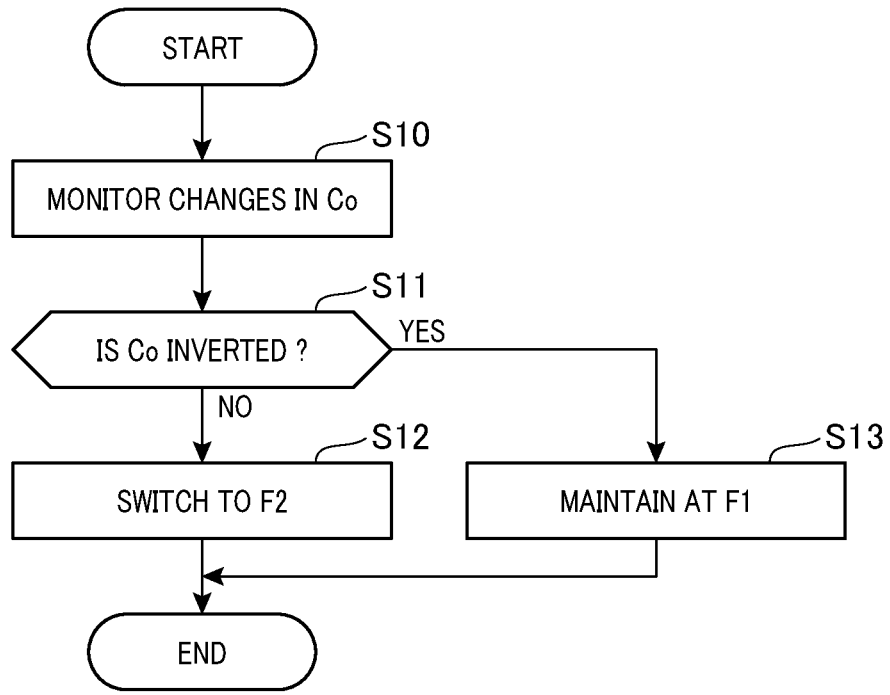
FIG. 6 is a flowchart of a frequency switching process according to the first embodiment.

Next, the frequency switching process performed by the control apparatus 30 will be described with reference to FIG. 6. The control apparatus 30 repeatedly performs the process in FIG. 6 at a predetermined period, by the processor 46.

At step S10, the control apparatus 30 monitors changes in the output signal Co of the comparator 352 during the single switching period Tsw. At step S11, the control apparatus 30 determines whether or not the output signal Co of the comparator 352 has switched (become inverted) from low to high during the single switching period Tsw based on the result of monitoring at step S10. Step S11 corresponds to a switching determining unit.

When a NO determination is made at step S11 (i.e., the control apparatus 30 determines that the output signal Co of the comparator 352 has switched from low to high during the single switching period Tsw), the control apparatus 30 proceeds to step S12. When the control apparatus 30 proceeds to step S12, the frequency of the operating signal GS is required to be switched. Therefore, the control apparatus 30 switches the frequency of the operating signal GS from the first frequency F1 to the second frequency F2. As a result, the on-operation period Ton of the operating signal GS during the single switching period Tsw increases.

When a YES determination is made at step S11 (i.e., the control apparatus 30 determines that the output signal Co of the comparator 352 has switched from low to high during the single switching period Tsw), the control apparatus 30 proceeds to step S13. When the control apparatus 30 proceeds to step S13, the frequency of the operating signal GS is not required to be switched. Therefore, the frequency of the operating signal GS is maintained at the first frequency F1.

Step S12 and step S13 correspond to a frequency switching unit. Upon completion of the process at step S12 or step S13, the control apparatus 30 temporarily ends the process in FIG. 6.

Next, effects according to the present embodiment will be described with reference to FIG. 7.

Figure 7:
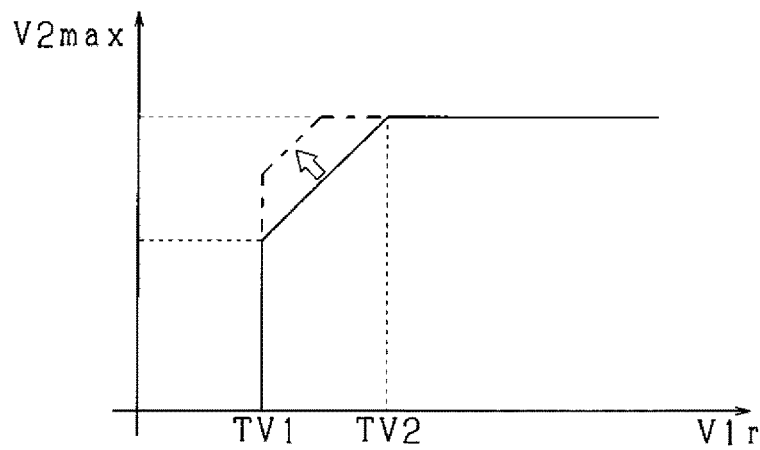
FIG. 7 is a diagram for explaining the effects according to the first embodiment.

FIG. 7 is a diagram for explaining an operable range of the power conversion apparatus 100. Specifically, FIG. 7 is a diagram in which a vertical axis indicates a maximum output value V2max of the output voltage V2r relative to a horizontal axis that indicates the input voltage V1r. In FIG. 7, a solid line indicates an operable range when the frequency of the operating signal GS is fixed at the first frequency F1. In addition, a broken line indicates an expanded portion of the operable range when the frequency of the operating signal GS is fixed at the second frequency F2.

In FIG. 7, the maximum output value V2max increases when the input voltage V1r changes from TV1 to TV2 that is on a low-voltage side of the input voltage V1r. Therefore, according to the present embodiment, as a result of the frequency of the operating signal GS being decreased, the range of the output voltage V2r can be expanded when the input voltage V1r is within the low-voltage-side range of TV1 to TV2 (see the operable range shown by a solid line and the operable range shown by a dashed line that is expanded as shown by a hollow arrow in FIG. 7).

Specifically, in the DC-DC converter 10 (buck converter), the output voltage V2r is obtained by multiplying the input voltage V1r by the time ratio (duty ratio) Dr (=Ton/Tsw) (i.e., V2r=V1r×Dr). Here, the time ratio Dr is also referred to as an "on-duty". Based on V2r=V1r×Dr, even if the input voltage V1r decreases, increase in the output voltage V2r may be possible due to increase in the on-duty.

An absolute value of a minimum off-operation period (off-time) Toff required during the single switching period Tsw is determined, based on element characteristic, regardless of the switching frequency. Based on this, as the switching frequency increases, a ratio of the minimum off-operation period Toff relative to the single switching period Tsw increases and thus, a maximum value of a possible on-duty decreases. In other words, as the switching frequency decreases, the maximum value of the possible on-duty Dr may increase.

Thus, in a case in which the output voltage V2r does not reach a desired output voltage even when the on-duty is maximized (the output signal Co of the comparator 352 is not inverted during the single switching period Tsw) at the first frequency F1, the switching frequency is changed from the first frequency F1 to the second frequency F2 (lower than the first frequency F1) and the maximum value of the possible on-duty Dr at the second frequency F2 is greater than that at the first frequency F1, so that the output voltage V2r may reach the desired output voltage.

Therefore, compared to a case in which the switching frequency is fixed, the present embodiment makes it possible to obtain a higher output voltage V2r from a lower input voltage V1r (see the maximum output value V2max at the low-voltage-side range of TV1 to TV2 of the input voltage V1r in FIG. 7).

The following effects are obtained according to the present embodiment described above.

When detected that the output signal Co of the comparator 352 is not inverted during the single switching period Tsw of the drive switch 21, the control apparatus 30 determines that the frequency of the operating signal GS is required to be switched. When determined that the frequency is required to be switched, the control apparatus 30 switches the frequency of the operating signal GS from the first frequency F1 to the second frequency F2 that is lower than the first frequency F1. Therefore, the state in which the time ratio Dr of the on-operation period of the drive switch 21 is at the maximum value thereof can be ascertained while the peak current mode control is being performed. In addition, the range of the output voltage V2r can be expanded when the input voltage V1r is in the low-voltage-side range of TV1 to TV2.

Second Embodiment

According to a second embodiment, differences from the first embodiment will mainly be described. Sections given the same reference numbers as those according to the first embodiment are identical sections. Descriptions thereof are not repeated.

The present embodiment differs from the first embodiment in that an exceptional condition is determined. The exceptional condition is that the frequency of the operating signal GS is not switched from the first frequency F1 to the second frequency F2 even when the output of the comparator 352 is not inverted. As a factor in the post-compensation reactor current AIL not increasing to the command current IL* and the output signal Co of the comparator 352 not becoming inverted, any of the following cases can be assumed. That is, the input voltage V1r is too low, the command voltage V2* is too high, or the reactor current ILr has temporarily decreased.

In a case where the factor in the output signal Co of the comparator 352 not becoming inverted is the temporary decrease in the reactor current ILr, the output voltage V2r may be unnecessarily increased when the frequency of the operating signal GS is decreased. Specifically, regardless of the input voltage V1r and the command voltage V2* being set to appropriate values, when the frequency of the operating signal GS is decreased in a state in which the reactor current ILr has temporarily decreased, the output voltage V2r increases.

Therefore, according to the present embodiment, when the factor in the output signal Co of the comparator 352 not becoming inverted is the temporary decrease in the reactor current ILr, the control apparatus 30 does not switch the frequency of the operating signal GS from the first frequency F1 to the second frequency F2.

A frequency switching process according to the second embodiment will be described with reference to FIG. 8. The control apparatus 30 repeatedly performs the process in FIG. 8 at a predetermined period.

After the process at step S10, at step S21, the control apparatus 30 acquires the input voltage V1r. At step S22, the control apparatus 30 acquires the command voltage V2*.

When a NO determination is made at step S11 that the output signal Co of the comparator 352 has not become inverted during the single switching period Tsw, the control apparatus 30 proceeds to step S23. According to the present embodiment, at step S23 and step S24, the control apparatus 30 determines whether or not the reactor current ILr of the power conversion apparatus 100 has temporarily decreased. Step S23 and step S24 correspond to the factor determining unit.

First, at step S23, the control apparatus 30 determines whether or not the input voltage V1r is equal to or less than an input voltage threshold TH1. According to the present embodiment, the input voltage threshold TH1 is determined as being an upper-limit value of the input voltage V1r when the output voltage V2r cannot be controlled to the command voltage V2* even when the frequency is set to the first frequency F1 and the drive switch 21 is operated using the operating signal GS in the state in which the time ratio Dr of the on-operation period Ton is set to the maximum value thereof.

When a YES determination is made at step S23 (i.e., the control apparatus 30 determines that the input voltage V1r is equal to or less than an input voltage threshold TH1), the control apparatus 30 proceeds to step S12. When the control apparatus 30 proceeds to step S12, the factor in the output signal Co of the comparator 352 not becoming inverted is the input voltage V1r being low. Therefore, the control apparatus 30 switches the frequency of the operating signal GS from the first frequency F1 to the second frequency F2.

When determined that the input voltage V1r is greater than the input voltage threshold TH1, the control apparatus 30 makes a NO determination at step S23 and proceeds to step S24. At step S24, the control apparatus 30 determines whether or not the command voltage V2* is equal to or greater than an output voltage threshold TH2. According to the present embodiment, the output voltage threshold TH2 is determined in the following manner. That is, the output voltage threshold TH2 is determined as being a lower-limit value of the command voltage V2* when the output voltage V2r cannot be controlled to the command voltage V2* even when the frequency is set to the first frequency F1 and the drive switch 21 is operated using the operating signal GS in the state in which the time ratio Dr of the on-operation period Ton is set to the maximum value thereof.

When a YES determination is made at step S24 (i.e., the control apparatus 30 determines that the command voltage V2* is equal to or greater than an output voltage threshold TH2), the control apparatus 30 proceeds to step S12. When the control apparatus 30 proceeds to step S12, the factor in the output signal Co of the comparator 352 not becoming inverted is the command voltage V2* being too high. Therefore, the control apparatus 30 changes the frequency of the operating signal GS from the first frequency F1 to the second frequency F2.

When determined that the command voltage V2* is less than the output voltage threshold TH2, the control apparatus 30 makes a NO determination at step S24 and proceeds to step S13. When the control apparatus 30 proceeds to step S13, the factor in the output signal Co of the comparator 352 not becoming inverted is considered to be the temporary decrease in the reactor current ILr. Therefore, the control apparatus 30 maintains the frequency of the operating signal GS at the first frequency F1.

Figure 8:
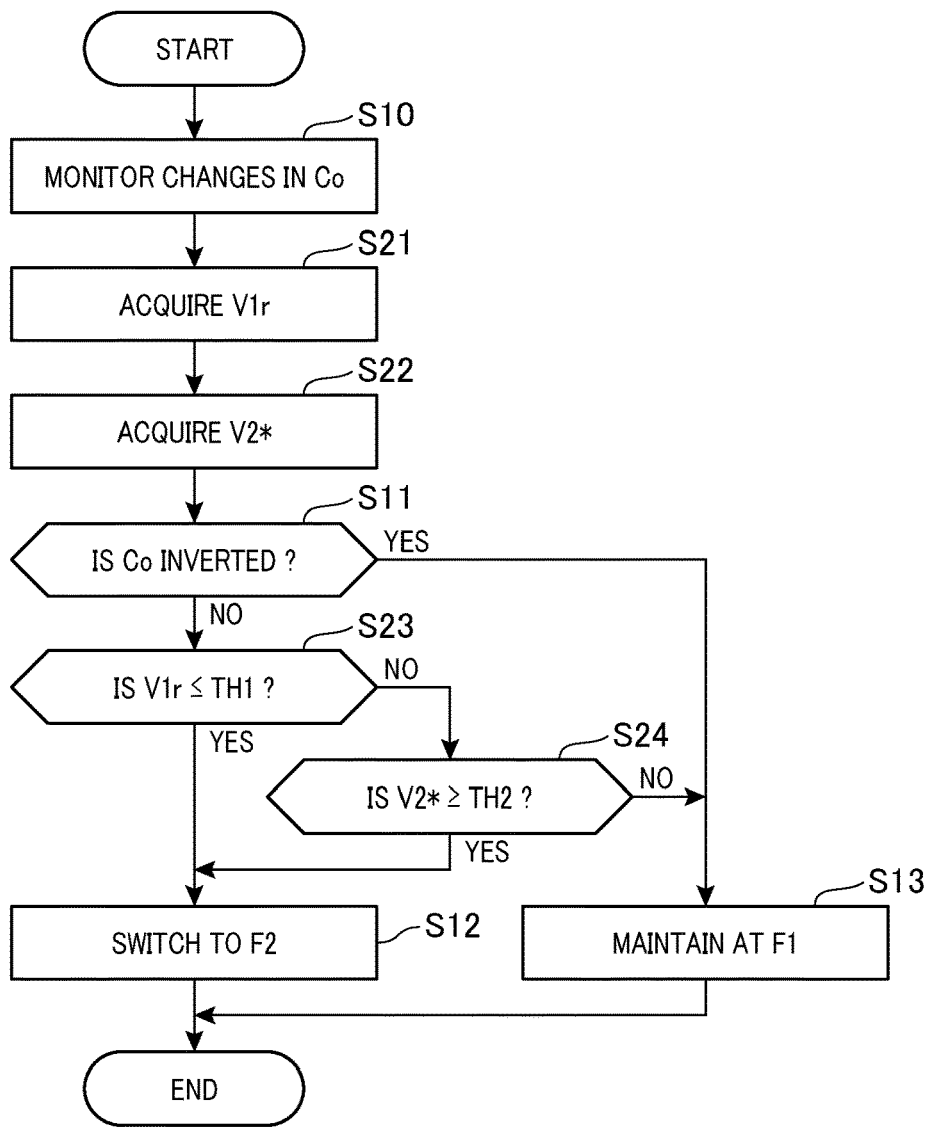
FIG. 8 is a flowchart of the steps in a frequency switching process according to a second embodiment.

Upon completion of the process at step S12 or step S13, the control apparatus 30 temporarily ends the process in FIG. 8.

The following effects are obtained according to the present embodiment described above.

When the output signal Co of the comparator 352 has not become inverted during the single switching period Tsw, the control apparatus 30 determines whether or not the factor in the reactor current ILr not increasing to the command current IL* is the temporary decrease in the reactor current IL*, based on the input voltage V1r and the command voltage V2*. When determined that the factor is based on the temporary decrease in the reactor current ILr, the control apparatus 30 maintains the frequency of the operating signal GS at the first frequency F1. In this case, unnecessary increase in the output voltage V2r can be prevented and power supply to the apparatus 70 can be stabilized.

Variation Example 1 According to the Second Embodiment

A frequency switching process in a variation example 1 according to the second embodiment will be described with reference to FIG. 9. The control apparatus 30 repeatedly performs the process in FIG. 9 at a predetermined period.

When a NO determination is made at step S11 that the output signal Co of the comparator 352 has not become inverted during the single switching period Tsw, the control apparatus 30 proceeds to step S31. At step S31, the control apparatus 30 determines whether or not the input voltage $V1r$ is equal to or less than the input voltage threshold TH1.

When a NO determination is made at step S31 (i.e., the control apparatus 30 determines that the input voltage $V1r$ is greater than the input voltage threshold TH1), the control apparatus 30 proceeds to step S13. Meanwhile, when a YES determination is made at step S31 (i.e., the control apparatus 30 determines that the input voltage $V1r$ is equal to or less than the input voltage threshold TH1), the control apparatus 30 proceeds to step S32. At step S32, the control apparatus 30 determines whether or not the command voltage $V2^*$ is equal to or greater than the output voltage threshold TH2.

When a YES determination is made at step S32 (i.e., the control apparatus 30 determines that the command voltage $V2^*$ is equal to or greater than the output voltage threshold TH2), the control apparatus 30 proceeds to step S12. When the control apparatus 30 proceeds to step S12, the frequency of the operating signal GS is switched from the first frequency F1 to the second frequency F2.

When a NO determination is made at step S32 (i.e., the control apparatus 30 determines that the command voltage $V2^*$ is less than the output voltage threshold TH2), the control apparatus 30 proceeds to step S13. When the control apparatus 30 proceeds to step S13, the factor in the output signal Co of the comparator 352 not becoming inverted is considered to be the temporary decrease in the reactor current ILr. Therefore, the frequency of the operating signal GS is maintained at the first frequency F1.

Figure 9:
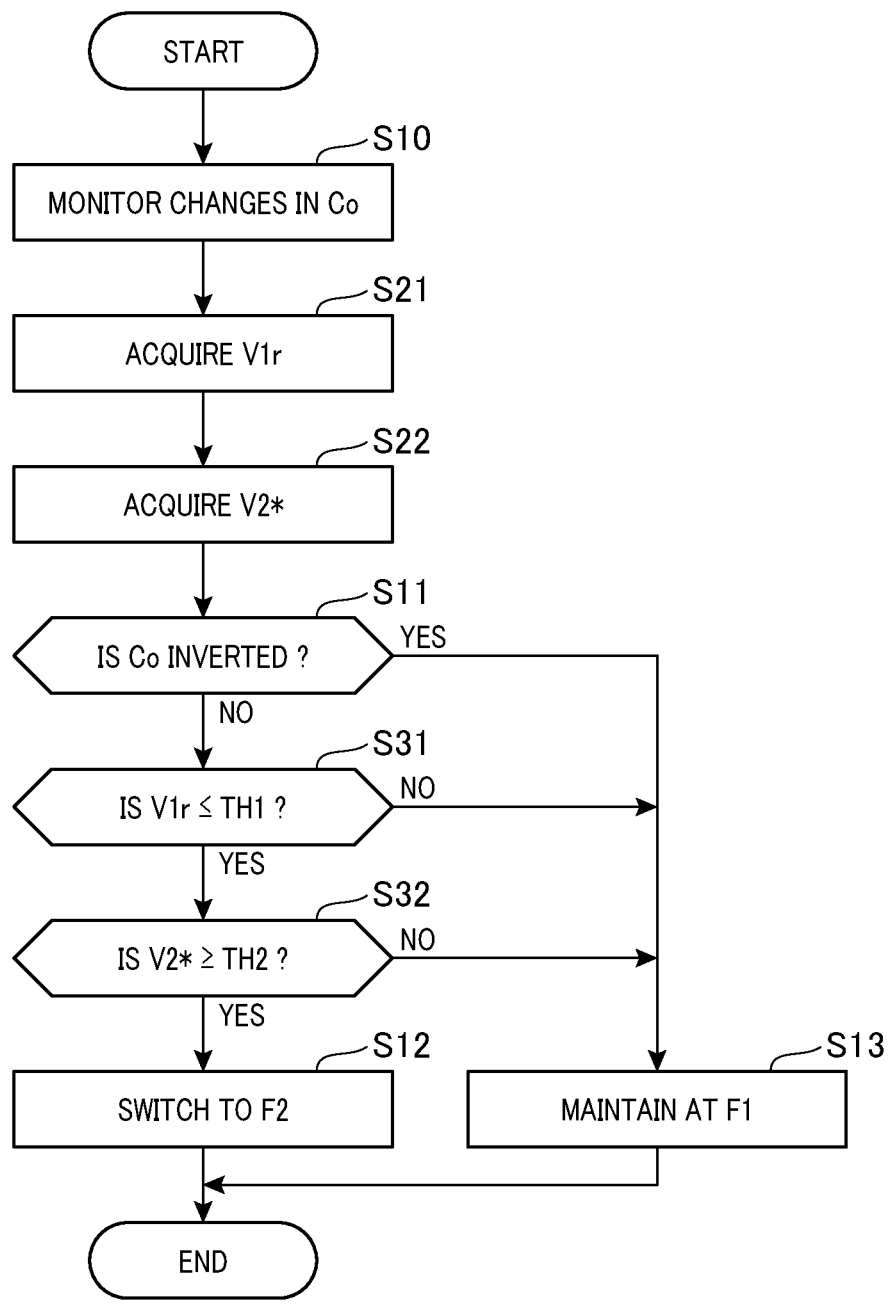
FIG. 9 is a flowchart of the steps in a frequency switching process in a variation example 1 according to the second embodiment.

Upon completion of the process at step S12 or step S13, the control apparatus 30 temporarily ends the process in FIG. 9.

The above-described variation example 1 according to the second embodiment achieves effects similar to those according to the second embodiment.

Variation Example 2 According to the Second Embodiment

In a variation example 2 according to the second embodiment, when a ratio of the command voltage $V2^*$ to the input voltage $V1r$ is less than a predetermined value, the factor in the output of the comparator 352 not becoming inverted is determined to be the temporary decrease in the reactor current ILr.

Figure 10:
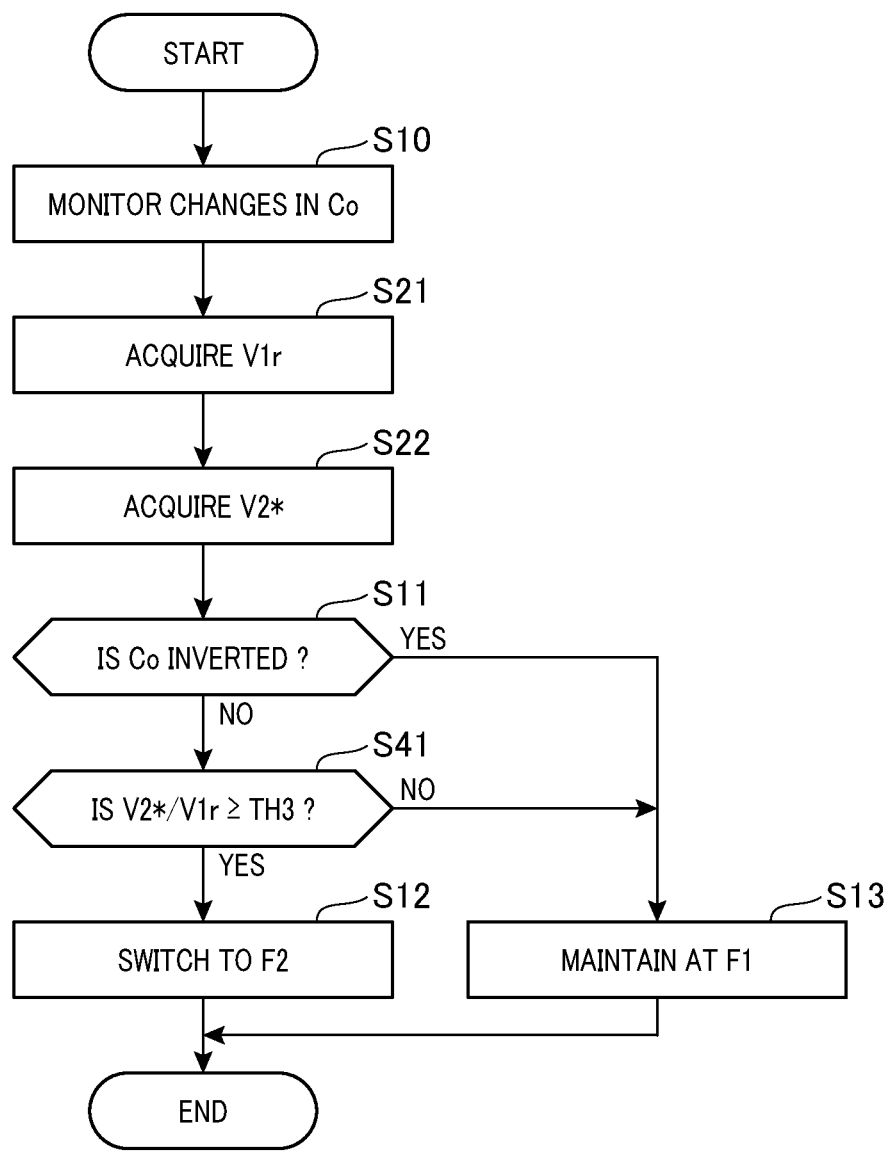
FIG. 10 is a flowchart of the steps in a frequency switching process in a variation example 2 according to the second embodiment.

A frequency switching process in the variation example 2 according to the second embodiment will be described with reference to FIG. 10. The control apparatus 30 repeatedly performs the process in FIG. 10 at a predetermined period.

When a NO determination is made at step S11 (i.e., the output signal Co of the comparator 352 has not become inverted during the single switching period Tsw), the control apparatus 30 proceeds to step S41. At step S41, the control apparatus 30 determines whether or not a determination ratio is equal to or greater than a determination threshold TH3. The determination ratio is the ratio of the command voltage $V2^*$ to the input voltage $V1r$. Here, when the command voltage $V2^*$ is the same, the determination ratio ($V2^*/V1r$) calculated at step S41 becomes a higher value as the input voltage $V1r$ decreases. In addition, when the input voltage $V1r$ is the same, the determination ratio calculated at step S41 becomes a higher value as the command voltage $V2^*$ increases. Furthermore, when the input voltage $V1r$ is low and the command voltage $V2^*$ is low, or when the input voltage $V1r$ is high and the command voltage $V2^*$ is high, the determination ratio does not become a value that is higher than a predetermined value.

According to the present embodiment, the determination threshold TH3 is determined based on a ratio of the upper-limit value of the input voltage $V1r$ and the lower-limit value of the command voltage $V2^*$ when the output voltage $V2r$ cannot be controlled to the command voltage $V2^*$ even when the frequency is set to the first frequency F1 and the drive switch 21 is operated using the operating signal GS in the state in which the time ratio Dr of the on-operation period Ton is set to the maximum value thereof.

When a YES determination is made at step S41 (i.e., the control apparatus 30 determines that a determination ratio is equal to or greater than a determination threshold TH3), the control apparatus 30 proceeds to step S12 and switches the frequency of the operating signal GS from the first frequency F1 to the second frequency F2. Meanwhile, when determined that the determination ratio is less than the determination threshold TH3 and a NO determination is made at step S41, the control apparatus 30 proceeds to step S13 and maintains the frequency of the operating signal GS at the first frequency F1.

The above-described variation example 2 according to the second embodiment achieves effects similar to those according to the second embodiment.

Variation Example 3 According to the Second Embodiment

In a variation example 3 according to the second embodiment, when a rate of decrease in the reactor current ILr is equal to or greater than a predetermined value, the factor in the output of the comparator 352 not becoming inverted is determined to be the temporary decrease in the reactor current ILr.

Figure 11:
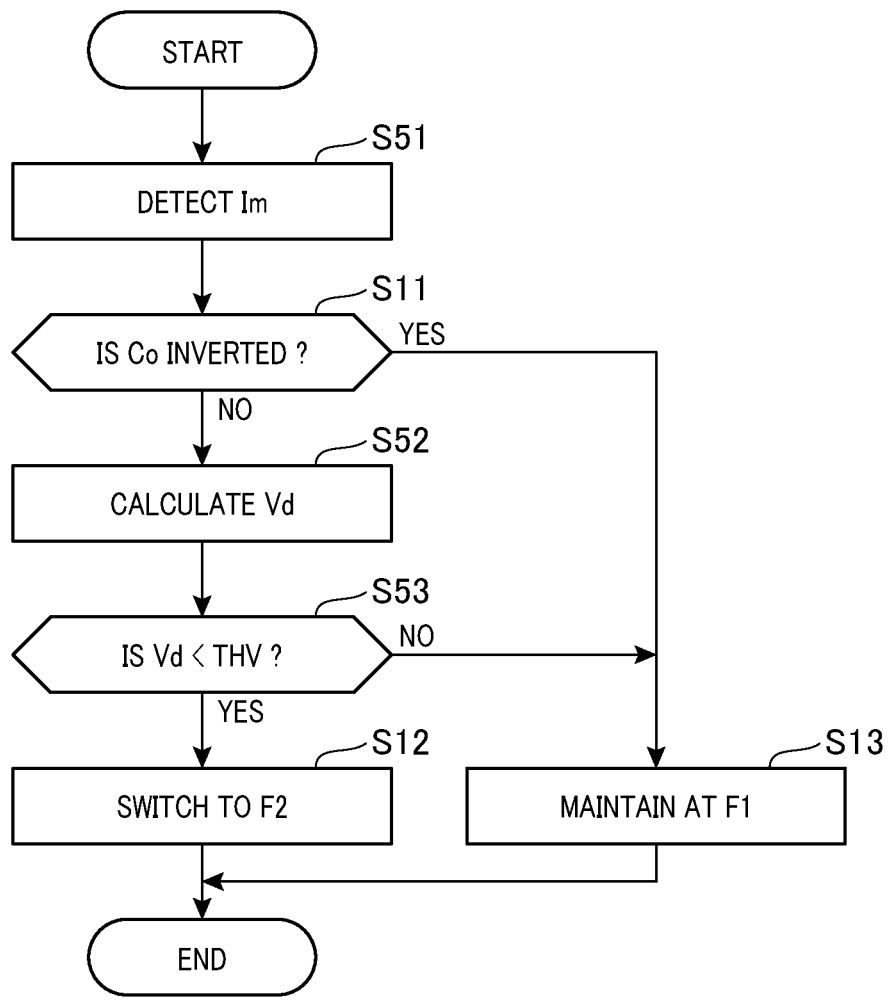
FIG. 11 is a flowchart of the steps in a frequency switching process in a variation example 3 according to the second embodiment.

A frequency switching process in the variation example 3 according to the second embodiment will be described with reference to FIG. 11. The control apparatus 30 repeatedly performs the process in FIG. 11 at a predetermined period.

At step S51, the control apparatus 30 detects a maximum current Im that is a maximum value of the post-compensation reactor current AIL during the single switching period Tsw. At step S51, the maximum current Im may be a maximum value of the reactor current ILr rather than the maximum value of the post-compensation reactor current AIL.

When a NO determination is made at step S11 that the output signal Co of the comparator 352 has not become inverted during the single switching period Tsw, the control apparatus 30 proceeds to step S52. At step S52, the control apparatus 30 calculates the rate of decrease in the maximum current Im of the post-compensation reactor current AIL detected at step S51. For example, the control apparatus 30 calculates an amount of decrease in the maximum current Im at each detection period of the maximum current Im. The control apparatus 30 then calculates a rate of decrease Vd by dividing the calculated amount of decrease by the detection period.

At step S3, the control apparatus 30 determines whether or not the rate of decrease Vd calculated at step S52 is less than a rate threshold THV. When determined that the rate of decrease Vd is less than the rate threshold THV and a YES determination is made at step S53, the control apparatus 30 proceeds to step S12 and switches the frequency of the operating signal GS from the first frequency F1 to the second frequency F2.

When determined that the rate of decrease Vd is equal to or greater than the rate threshold THV and a NO determination is made at step S53, the control apparatus 30 proceeds to step S13 and maintains the frequency of the operating signal GS at the first frequency F1.

The above-described variation example 3 according to the second embodiment achieves effects similar to those according to the second embodiment.

Third Embodiment

According to a third embodiment, configurations that differ from those according to the first embodiment will mainly be described. Sections given the same reference numbers as those according to the first embodiment are identical sections. Descriptions thereof are not repeated.

Figure 12:
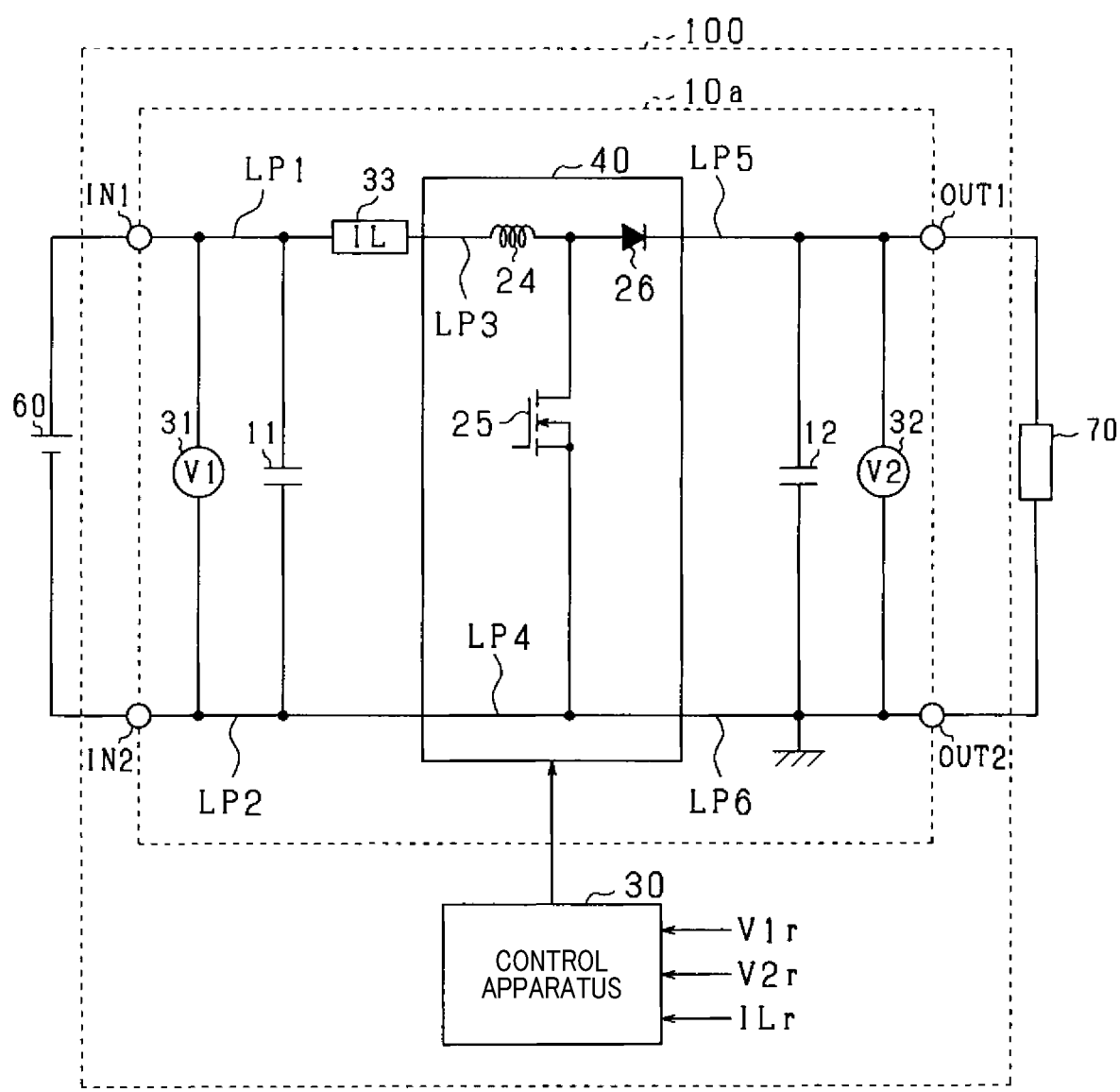
FIG. 12 is a circuit diagram of a power conversion apparatus according to a third embodiment.

According to the present embodiment, a DC-DC converter 10a is a boost-chopper-type converter. FIG. 12 is a configuration diagram of the power conversion apparatus 100 according to the third embodiment.

A main circuit 40 includes a reactor 24, a drive switch 25, and a diode 26. The reactor 24 is connected in series to the third wiring LP3. An anode of the diode 26 that is connected in series to the third wiring LP3 is connected to a second end of the reactor 24. A cathode of the diode 26 is connected to the smoothing capacitor 12 side in the third wiring LP3. In addition, in the third wiring LP3, a drain of the drive switch 25 is connected between the second end of the reactor 24 and the anode of the diode 26.

Furthermore, in the first wiring LP1, the current sensor 33 is connected between a connection point of the filter capacitor 11 and the main circuit 40. As a result, the current sensor 33 detects a current that flows into the main circuit 40 from the positive terminal of the direct-current power supply 60 as the reactor current ILr.

According to the present embodiment as well, the control apparatus 30 performs the peak current mode control. Specifically, the control apparatus 30 operates the drive switch 25 so as to control the reactor current ILr to the command current IL*. In addition, the control apparatus 30 determines the state in which the time ratio Dr of the on-operation period Ton is at the maximum value thereof based on whether or not the output signal Co of the comparator 352 is inverted during the single switching period Tsw.

According to the above-described third embodiment, the boost-type DC-DC converter 10a also achieves effects similar to those according to the first embodiment.

Other Embodiments

The main circuit provided in the DC-DC converter may be configured to include two or more drive switches. In this case, the control apparatus 30 may be configured to perform the peak current mode control for each drive switch.

The DC-DC converter 10 may also be an isolated buck converter (step-down converter) or an isolated boost converter that includes a transformer.

The current sensor 33 may be positioned on the source side of the drive switch. In addition, when the main circuit 20 or 40 is configured to include two or more drive switches, a current sensor may be provided on the drain side or the source side of each drive switch.

What is claimed is:

1. A control apparatus for a power conversion apparatus, the power conversion apparatus including
a reactor,
a drive switch that is turned on and off, and
a current detecting unit that detects a reactor current that flows to the reactor, and a signal generating unit that generates a basic signal that determines a single switching period of the drive switch,
the control apparatus comprising:
a current control unit that includes a comparator, the comparator inverting output of the comparator when the reactor current increases to a command current, the current control unit performing peak current mode control in which the drive switch is turned off when the output of the comparator is inverted during an on-operation period determined by the basic signal; and
a processor configured to:
determine that a switching frequency of the drive switch is required to be switched when the output of the comparator is detected to have not become inverted during the single switching period while the peak current mode control is being performed; and
set the switching frequency to a first frequency when determined that the switching frequency is not required to be switched, and switch the switching frequency from the first frequency to a second frequency that is lower than the first frequency when determined that the switching frequency is required to be switched.

2. The control apparatus for a power conversion apparatus according to claim 1, further comprising:
a voltage detecting unit that detects an input voltage of the power conversion apparatus, wherein
the processor is further configured to:
determine, when determined that the switching frequency is required to be switched, whether a factor in the reactor current not reaching the command current is based on a temporary decrease in the reactor current, based on at least one of the reactor current, the input voltage, and a command value of an output voltage; and
maintain, when determined that the factor is based on the temporary decrease in the reactor current, the switching frequency at the first frequency regardless of the determination result of the processor.

3. The control apparatus for a power conversion apparatus according to claim 2, wherein
the processor determines that the factor is based on the temporary decrease in the reactor current in at least either of a case in which the input voltage is greater than a predetermined input voltage threshold and a case in which the command value of the output voltage is less than a predetermined output voltage threshold.

4. The control apparatus for a power conversion apparatus according to claim 2, wherein
the processor determines that the factor is based on the temporary decrease in the reactor current when a ratio of the command value of the output voltage to the input voltage is less than a determination threshold.

5. A power conversion apparatus comprising:
a reactor;
a drive switch that is turned on and off;
a current detecting unit that detects a reactor current that flows to the reactor;

a signal generating unit that generates a basic signal that determines a single switching period of the drive switch; and a control apparatus, the control apparatus comprising:
- a current control unit that includes a comparator, the comparator inverting output of the comparator when the reactor current increases to a command current, the current control unit performing peak current mode control in which the drive switch is turned off when the output of the comparator is inverted during an on-operation period determined by the basic signal; and
- a processor configured to:
    - determine that a switching frequency of the drive switch is required to be switched when the output of the comparator is detected to have not become inverted during the single switching period while the peak current mode control is being performed; and
    - set the switching frequency to a first frequency when determined that the switching frequency is not required to be switched, and switch the switching frequency from the first frequency to a second frequency that is lower than the first frequency when determined that the switching frequency is required to be switched.

6. A control method for a power conversion apparatus, the power conversion apparatus including a reactor, a drive switch that is turned on and off, a current detecting unit that detects a reactor current that flows to the reactor, and a signal generating unit that generates a basic signal that determines a single switching period of the drive switch, the control method comprising:

performing peak current mode control in which the drive switch is turned off when output of a comparator is inverted during an on-operation period determined by the basic signal, the comparator inverting the output of the comparator when the reactor current increases to a command current;

determining that a switching frequency of the drive switch is required to be switched when the output of the comparator is detected to have not become inverted during the single switching period while the peak current mode control is being performed; and setting the switching frequency to a first frequency when determined that the switching frequency is not required to be switched, and switching the switching frequency from the first frequency to a second frequency that is lower than the first frequency when determined that the switching frequency is required to be switched.

* * * * *